119,812

UNITED STATES PATENT OFFICE.

ROBERT BEVILL, OF BOWIE COUNTY, TEXAS.

IMPROVEMENT IN MEDICAL COMPOUNDS FOR TREATING CHILLS, FEVER, &c.

Specification forming part of Letters Patent No. 119,812, dated October 10, 1871.

*To all whom it may concern:*

Be it known that I, ROBERT BEVILL, of the county of Bowie and State of Texas, have invented or discovered a new and useful Medical Compound for the cure of Chills and Fevers, Enlargement of the Spleen, Sun Pain, and all bilious affections, and called said compound the True Ague Pill.

The component parts of which are as follows, to wit: Forty grains of quinine; forty grains of carbonate of iron; 30 grains of aloes; 20 grains of capsicum. The above ingredients being properly combined are sufficient to make twenty-one pills or one box.

I claim as my invention—

A chemical compound, of the ingredients and for the purpose set forth.

The above specification of my invention signed and witnessed at Boston this 21st day of June, 1871.

ROBERT BEVILL.

Witnesses:
  W. H. TILSON,
  JOHN LONG.